Oct. 7, 1958

R. U. SIMS ET AL 2,855,566

PHASE COMPARATOR

Filed Aug. 24, 1954

INVENTORS
RAYMOND U. SIMS
FREDERICK J. LEONARD
BY *G. J. O'Brien*

ATTORNEY

Oct. 7, 1958 R. U. SIMS ET AL 2,855,566
PHASE COMPARATOR
Filed Aug. 24, 1954 2 Sheets-Sheet 2

INVENTORS
RAYMOND U. SIMS
FREDERICK J. LEONARD
BY
ATTORNEYS

United States Patent Office 2,855,566
Patented Oct. 7, 1958

2,855,566

PHASE COMPARATOR

Raymond U. Sims, Sharon, and Frederick J. Leonard, Pittsburgh, Pa., assignors, by mesne assignments, to the United States of America as represented by the Secretary of the Navy Application August 24, 1954, Serial No. 451,994

7 Claims. (Cl. 324—83)

This invention relates to phase comparators and in particular to a phase comparator suited for use at relatively low frequencies.

The need frequently arises for a device that will measure the phase angle between two alternating voltages of relatively low frequency. Conventional phase sensitive detectors, or phase comparators, which are suitable at higher frequencies can be adapted for low frequency use, but such arrangements are not practical when the circuit requires transformers. Transformers for such use at sub-audio frequencies are very large in size and weight and require accurately balanced windings. The large size of weight of such transformers, together with the further expense of providing balanced windings therein make such a solution generally impractical. While balanced D. C. amplifiers have been used to take the place of transformers in some applications, the susceptibility of D. C. amplifiers to drift, and the requirement for a power supply with a negative output with respect to ground in order to encompass a ground output potential makes the use of D. C. amplifiers in low frequency phase comparators also undesirable.

It is, therefore, an object of this invention to provide an improved phase comparator suited for use at relatively low frequencies.

It is a further object of this invention to provide a low frequency phase comparator which is compact, rugged and accurate in operation.

It is a still further object of this invention to provide a low frequency phase comparator which does not require transformers or D. C. amplifiers.

Other objects and many of the attendant advantages of this invention will be readily appreciated as the same become better understood by reference to the following detailed description when considered in connection with the accompanying drawing wherein.

Figure 1:
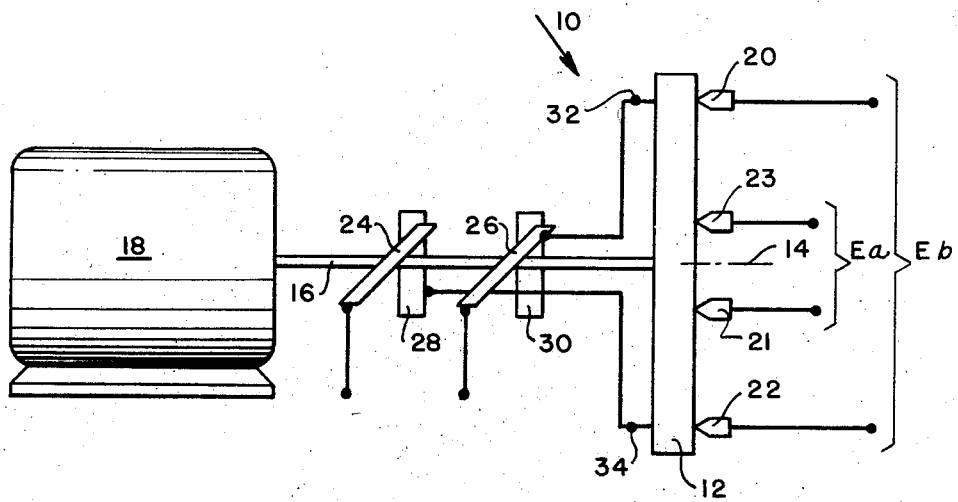
Fig. 1 is a schematic diagram of a sine-cosine potentiometer and driving means therefor as used in the invention.
Figure 2:
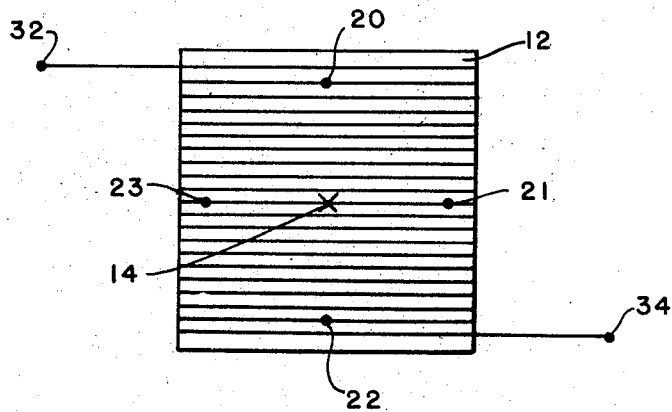
Fig. 2 illustrates the potentiometer card in a reference orientation relative to associated brush contacts.

Referring to Figs. 1 and 2, the phase comparator constituting this invention makes use of a conventional sine-cosine potentiometer 10. Potentiometer 10 has a wire-wound resistance card 12 that is mounted for rotation about axis of rotation 14, by means of shaft 16 of motor 18. Motor 18 may be any suitable type that can drive resistor card 12 at the desired angular velocity, namely at a rotational speed which (in revolutions per second) is equal to $2\pi$ times the frequency (in cycles per second) of the input voltage whose phase is to be determined. Of course, for angular velocities corresponding to relatively low frequencies, motor 18 may conventionally incorporate suitable reduction gearing, thus not separately shown in Fig. 1. Four stationary pickoff brushes are mounted, by any suitable means, not illustrated, so as to engage the resistor card 12 at substantially equal distances from the axis of rotation 14. Lines through opposite pairs of contacts 20, 22, and 21, 23, intersect axis 14 and also intersect each other at right angles. Brushes 24, 26 and slip rings 28, 30 conduct the input voltage to terminals 32, 34 of resistor card 12, and the described arrangement yields an output voltage $E_a$ at brushes 21, 23 and an output voltage $E_b$ at brushes 20, 22.

If a direct voltage E were applied between terminals 32, 34 of card 12, with card 12 rotating uniformly, the voltage $E_a$ between diametrically opposite terminals 21 and 23 would be:

Eq. (1) $\qquad E_a = E \sin wt;$ and the voltage $E_b$ between the diametrically opposite terminals 20 and 22 would be:

Eq. (2) $\qquad E_b = E \cos wt$ where $w$ is the angular velocity of card 12 about axis 14, and where time $t$ is measured from each instant at which the card 12 is in the reference orientation relative to the four stationary brushes 20—23, shown in Fig. 2. Thus, the sine-cosine potentiometer arrangement provides a modulating action, multiplying an input voltage by the factor $\sin wt$ at one pair of pickoff brushes, and by the factor $\cos wt$ at the other pair of pickoff brushes. It is convenient to regard the output voltage $E_a$ resulting from application of direct voltage E to the potentiometer card 12 as a reference voltage, for phase-comparison purposes as will appear. Such a reference voltage may in fact be separately generated, by application of a direct voltage, as described, to a like potentiometer card (requiring only one pair of pickoff brushes, however) similarly oriented and driven in synchronism with potentiometer card 12. This reference voltage may also serve as the voltage upon which a phase shift is imposed by any load circuit, the phase-shifted voltage then being applied to the previously described potentiometer card for sensing the said phase shift. By way of example, the present invention is so utilized in the "Continuous Wave Acoustic Guidance System" and in the "Torpedo Location System" disclosed in copending U. S. patent applications S. N. 414,525 (filed Mar. 5, 1954) and S. N. 581,263 (filed Apr. 27, 1956), by William H. Hamilton et al. and William Altar et al., respectively, these applications being assigned, by mesne assignments, to the United States of America as represented by the Secretary of the Navy.

It will now be understood that the output voltages $E_a$ and $E_b$ which result from application of an alternating voltage $E_m \sin (wt+\phi)$ to the input terminals 32, 34 is given by:

Eq. (3) $\qquad E_a = E_m \sin (wt+\phi) \sin wt,$ and

Eq. (4) $\qquad E_b = E_m \sin (wt+\phi) \cos wt$ where $E_m$ is the peak value of the applied alternating voltage and $\phi$ is the phase angle between the applied alternating voltage and the reference voltage described above.

Upon expanding Equations 3 and 4 they yield

Eq. (5)

$$E_a = E_m \sin (wt+\phi) \sin wt = \frac{E_m}{2} [\cos \phi - \cos (2 wt+\phi)]$$

Eq. (6)

$$E_b = E_m \sin (wt+\phi) \sin wt = \frac{E_m}{2} [\sin \phi + \sin (2 wt+\phi)]$$

Thus, the output voltage $E_a$ as defined by Equation 5 contains a D. C. term, $$\frac{E_m}{2}\cos\phi$$

and the output voltage $E_b$ as defined by Equation 6 contains a D. C. term $$\frac{E_m}{2}\sin\phi$$

these D. C. components being sine of $\phi$, and the average values of the potentials between terminals 20, 22 and between terminals 21, 23 and yielding sufficient information to uniquely determine $\phi$, the phase angle between the alternating voltage applied across resistor card 12 with respect to the reference voltage. The polarities of these D. C. components determine the quadrant in which the phase angle lies, and the magnitude of either component provides the additional information necessary for precisely defining the phase angle.

From the foregoing it is clear that sine-cosine potentiometer 10 functions as a phase comparator, since it provides output voltages having D. C. components of sense and magnitude dependent upon the phase angle of an input voltage relative to a reference voltage corresponding to card rotation, these D. C. components being easily measured and serving to define the said phase angle. As indicated, the system requires only that the input voltage, whose phase it is desired to determine, be applied across resistor card 12, and that card 12 be rotated by motor 18 at the angular velocity equal to $2\pi$ times the frequency of the input voltage. An actual reference voltage is not essential since its place is taken by the action of potentiometer 10, but as a matter of practicality it is ordinarily preferable that the rotation of potentiometer card 12 correspond directly with the very reference voltage to which the phase-shifted input voltage is related. For example, this may be accomplished by use of a pair of potentiometer cards, as already mentioned, driven in unison and utilized in the manner shown in Fig. 3, a simplified presentation derived from the disclosures given in the above-mentioned copending applications.

Figure 3:
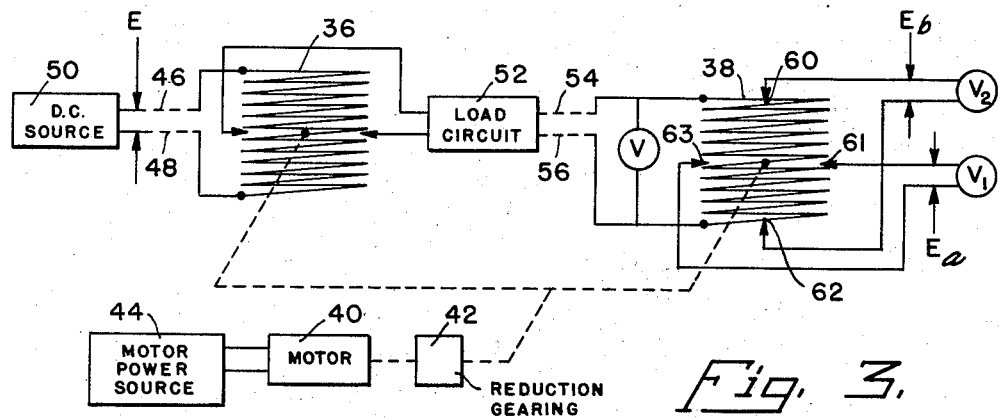
Fig. 3 is a schematic of a typical circuit employing the present invention.

Thus, referring to Fig. 3, a preferred embodiment of the invention comprises a pair of potentiometer cards 36, 38 driven in unison, as indicated, by motor 40 through reduction gearing 42, the motor being energized by any suitable power source 44. Potentiometer cards 36, 38 in this instance have like orientation, card 36 having a direct voltage E applied thereto from D. C. source 50, via conventional slip ring connections 46, 48 here shown schematically. Card 36 thus delivers an alternating voltage $E\sin wt$ as indicated earlier with reference to Figs. 1 and 2. This voltage $E\sin wt$ may be subjected to magnitude change and phase shift, by any load circuit 52, such that the output thereof may be expressed as $E_m \sin(wt+\phi)$, the several symbols therein having the same definitions as given earlier. The magnitude $E_m$ is of course readily determined by means of a conventional voltmeter V, if necessary. The phase-shifted voltage $E_m \sin(wt+\phi)$ is applied to potentiometer card 38 via slip ring connections 54, 56 again shown schematically. This voltage is likewise modulated by potentiometer card 38 in the same manner as already described in detail with reference to the potentiometer card 12 of Figs. 1 and 2, thus providing output voltages $E_a$ and $E_b$ at pickoff brushes 61, 63 and 60, 62 and again defined, respectively, by Equations 5 and 6 above.

Figure 4:
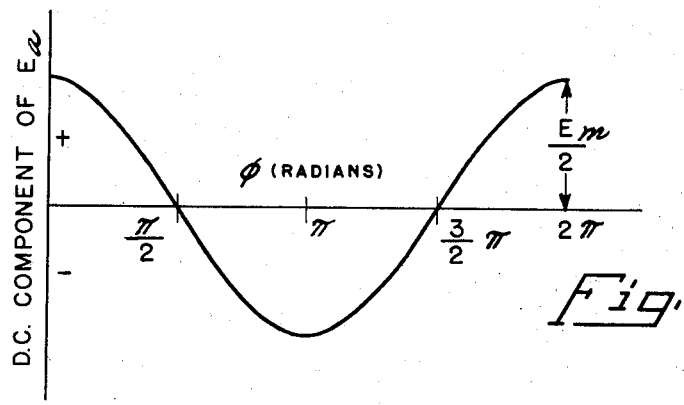
Figs. 4 and 5 are graphs illustrating the manner in which D. C. components of the output voltages, as provided by the present invention, vary with the phase condition of an input voltage.
Figure 5:
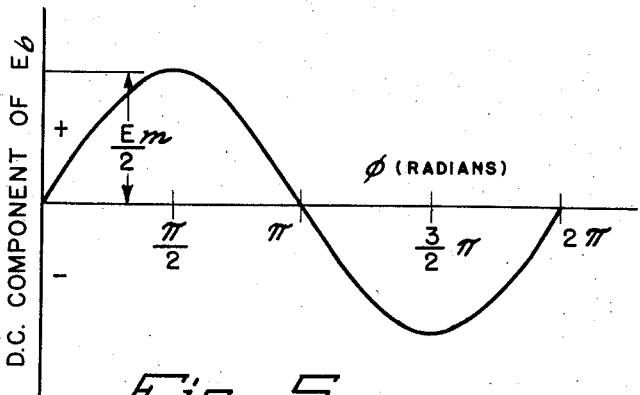

The manner in which the D. C. components of the latter voltages $E_a$ and $E_b$ vary with phase angle $\phi$ of the input voltage applied to potentiometer card 38, are graphed in Figs. 4 and 5, respectively, and it is of course apparent by inspection of these graphs that phase angles lying between certain specific limits can be uniquely determined by measurement of the D. C. component of either $E_a$ or $E_b$ as the case may be, and that any phase angle, without limitation, can be uniquely determined by measurement of both of these D. C. components. In the apparatus described in the above-mentioned copending applications, it proves sufficient to apply the output voltages $E_a$ and $E_b$ as energizing voltages to relays which effectively respond only to the averages thereof, that is, to the D. C. components thereof, and which selectively close one circuit or another in accordance with the particular polarity of the said D. C. components. In view of the preceding description, it is apparent that a determination of the magnitude of these D. C. components, in addition to their polarity, defines the phase angle completely, and of course any one of a number of conventional techniques may be utilized for such determination of the characteristics of the said D. C. components. In the illustrated embodiment, the simplest of such techniques is employed, namely D. C. voltmeters $V_1$ and $V_2$, preferably of centered-zero type in order to avoid the need for connection reversal, which inherently respond only to the average values or D. C. components of the voltages $E_a$ and $E_b$. Such measuring technique proves entirely adequate in the described apparatus.

Thus, the apparatus disclosed herein functions to convert an input A. C. voltage, of unknown phase relative to a reference in effect provided by action of the rotating sine-cosine potentiometer card, or separately provided by a like card as described, to output voltages $E_a$ and $E_b$ each having an average value or D. C. component having sense and magnitude characteristics dependent upon the input voltage phase angle, these D. C. components being readily measurable and serving to uniquely define the said phase angle.

Obviously many modifications and variations of the present invention are possible in the light of the above teachings. It is, therefore, to be understood that within the scope of the appended claims the invention may be practiced otherwise than as specifically described.

What is claimed is:

1. An electro-mechanical apparatus comprising a converter of resistance-card type having a rotatable member and adapted to multiply an input voltage by the trigonometric sine of angular displacement of said member relative to a reference orientation of said member, means for applying an A. C. voltage of radian frequency $w$ as an input voltage to said converter, means for rotating said member at a corresponding angular speed $w$ to cause said input A. C. voltage to be modulated by a multiplying factor expressed as $\sin wt$ and effectively providing a similarly expressed phase-reference datum vector, wherein $t$ represents variable time measured from the instant at which the rotating member occupies said reference orientation, whereby said converter provides an output complex voltage having a D. C. component variable in accordance with the trigonometric sine of the phase angle of said input A. C. voltage relative to said datum vector, and utilization means responsive only to said D. C. component.

2. An electro-mechanical apparatus, comprising a converter of resistance-card type having a rotatable member and adapted to provide first and second output voltages which are proportional to an input voltage multiplied in said converter by the trigonometric sine and cosine, respectively, of angular displacement of said member relative to a reference orientation of said member, means for applying an A. C. voltage of radian frequency $w$ as an input voltage to said converter, means for rotating said member at a corresponding angular speed $w$ to cause said first and second output voltages to be equal to said input A. C. voltage modulated by multiplying factors expressed as $\sin wt$ and $\cos wt$, respectively, $\sin wt$ also defines a phase-reference datum vector, wherein $t$ represents variable time measured from the instant at which the rotating member occupies said reference orientation, whereby said output voltages include D. C. components fully identifying the phase angle of said input A. C. voltage relative to said datum vector, and utilization means responsive only to said D. C. components.

3. An apparatus for use in identifying the phase angle $\phi$ of an A. C. signal $E_{in}$ expressed as $E_m \sin(wt+\phi)$ relative to a rotating reference vector sin $wt$, said apparatus comprising a converter, means for applying the A. C. signal $E_{in}$ to the converter, said converter being adapted to provide first and second output signals $E_a$ and $E_b$ equal to $E_{in} \sin wt$ and $E_{in} \cos wt$, respectively, whereby said first and second output signals $E_a$ and $E_b$ include D. C. components equal to $$\frac{E_m}{2} \sin \phi \text{ and } \frac{E_m}{2} \cos \phi$$

respectively, and means for measuring said D. C. components to identify said phase angle $\phi$.

4. An apparatus as defined in claim 3, wherein said converter comprises a sine-cosine card assembly having a pair of input terminals to which said A. C. signal $E_{in}$ is applied, a rotatable member, two pair of output terminals, and means for driving said member at a corresponding angular speed $w$ to provide, at the two pair of output terminals, said output signals $E_a$ and $E_b$ equal respectively to $E_{in} \sin wt$ and $E_{in} \cos wt$.

5. An electro-mechanical apparatus comprising first and second converters which are each of resistance-card type having a rotatable member and adapted to multiply an input voltage by the trigonometric sine of angular displacement of said member relative to a reference orientation of said member, means for rotating said members in synchronism at an angular speed $w$, means for applying a D. C. voltage E to said first converter whereby to produce a first A. C. voltage $E \sin wt$, wherein $w$ is the radian frequency and $t$ is the variable time measured from the instant at which the rotating member occupies said reference orientation, means for applying to said second converter a second A. C. voltage derived from said first A. C. voltage and expressed as $E_m \sin(wt+\phi)$, wherein $E_m$ is the magnitude of said second A. C. voltage and $\phi$ is the phase angle thereof relative to said first A. C. voltage, whereby said second converter provides an output complex voltage having a D. C. component variable in accordance with the trigonometric sine of said phase angle, and utilization means responsive only to said D. C. component.

6. An electro-mechanical apparatus, comprising first and second converters which are each of resistance-card type having a rotatable member, said first converter adapted to multiply an input voltage by the trigonometric sine of angular displacement of its rotatable member relative to a reference orientation thereof, said second converter adapted to provide first and second output voltages equal to an input voltage multiplied by the trigonometric sine and cosine, respectively, of angular displacement of its rotatable member relative to a reference orientation thereof, means for rotating said members in synchronism at an angular speed $w$, means for applying a D. C. voltage E to said first converter whereby to produce a first A. C. voltage $E \sin wt$, wherein $w$ is a corresponding radian frequency and $t$ is a variable time measured from the instant at which the rotating member occupies said reference orientation, means for applying to said second converter a second A. C. voltage derived from said first A. C. voltage and expressed as $E_m \sin(wt+\phi)$, wherein $E_m$ is the magnitude of said second A. C. voltage and $\phi$ is the phase angle thereof relative to said first A. C. voltage, whereby said second converter provides output complex voltages $E_a$ and $E_b$ equal to $[E_m \sin(wt+\phi)] \sin wt$ and $[E_m \sin wt+\phi] \cos wt$, respectively, whereby said voltages $E_a$ and $E_b$ include D. C. components $$\frac{E_m}{2} \sin \phi \text{ and } \frac{E_m}{2} \cos \phi$$

respectively, and utilization means responsive to said D. C. components.

7. An electro-mechanical apparatus, comprising a converter, means for applying to said converter an A. C. signal $E_{in}$ expressed as $E_m \sin(wt+\phi)$ relative to a rotating reference vector sin $wt$, said converter being adapted to provide an output signal $E_a$ equal to $E_{in} \sin wt$, whereby said output signal $E_m$ includes a D. C. component.

$$\frac{E_m}{2} \sin \phi$$

and utilization means responsive only to said D. C. component.

References Cited in the file of this patent

UNITED STATES PATENTS

| 2,457,178 | Richardson | Dec. 28, 1948 |
| 2,764,657 | Rosenthal | Sept. 25, 1956 |

FOREIGN PATENTS

| 699,832 | Great Britain | Nov. 18, 1953 |